US010880937B2

United States Patent
Wiberg et al.

(10) Patent No.: US 10,880,937 B2
(45) Date of Patent: Dec. 29, 2020

(54) METHOD AND DEVICES FOR CONNECTING A USER EQUIPMENT WITH A RADIO ACCESS NETWORK IN A TELECOMMUNICATION NETWORK

(71) Applicant: Telefonaktiebolaget LM Ericsson (publ), Stockholm (SE)

(72) Inventors: Niclas Wiberg, Linköping (SE); Håkan Andersson, Linköping (SE); John Skördeman, Brokind (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/511,254

(22) PCT Filed: Feb. 21, 2017

(86) PCT No.: PCT/EP2017/053875
§ 371 (c)(1),
(2) Date: Mar. 15, 2017

(87) PCT Pub. No.: WO2018/153427
PCT Pub. Date: Aug. 30, 2018

(65) Prior Publication Data
US 2018/0310352 A1 Oct. 25, 2018

(51) Int. Cl.
*H04W 76/15* (2018.01)
*H04L 5/00* (2006.01)
(Continued)

(52) U.S. Cl.
CPC ........... *H04W 76/15* (2018.02); *H04L 5/0035* (2013.01); *H04W 72/04* (2013.01); *H04W 76/16* (2018.02); *H04W 80/02* (2013.01)

(58) Field of Classification Search
CPC .............................. H04W 88/06; H04W 76/15
See application file for complete search history.

(56) References Cited

U.S. PATENT DOCUMENTS

| 7,802,001 | B1 | 9/2010 | Petry et al. | |
|---|---|---|---|---|
| 7,948,948 | B2 * | 5/2011 | Xu | .......................... H04L 27/36 370/310 |

(Continued)

FOREIGN PATENT DOCUMENTS

| BR | 112019015833 | A2 * | 3/2020 | ............ H04W 76/15 |
|---|---|---|---|---|
| CA | 3054218 | A1 * | 8/2018 | ............ H04W 76/16 |

(Continued)

OTHER PUBLICATIONS

Ericsson; Inter-cell and intra-cell mobility in multi-TRP deployments; 3GPP TSG-RAN WG2 #96 Tdoc R2-168719; Reno, Nevada, USA; Nov. 14-18, 2016; pp. 1-4.

*Primary Examiner* — Eric Nowlin
(74) *Attorney, Agent, or Firm* — Coats + Bennett, PLLC

(57) ABSTRACT

A method of connecting a User Equipment, UE, with a radio access network, RAN, in a telecommunication network, wherein said RAN comprises a plurality of Baseband Units, BBU's, wherein said UE comprises two multi layered protocol stacks that can be used for same type of connections with BBU's and wherein said UE is connected to a first BBU using a first of said two protocol stacks for communication with said first BBU, said method comprising the steps of receiving, by a second BBU, from a network node in said telecommunication network, a Stack Selector parameter, wherein said Stack Selector parameter indicates which of said two protocol stacks are to be used by said UE for said communication with said second BBU, transmitting, by said second BBU, to said UE a downlink grant message, wherein said downlink grant message comprises said Stack Selector parameter.

17 Claims, 8 Drawing Sheets

(51) Int. Cl.
  *H04W 76/16* (2018.01)
  *H04W 72/04* (2009.01)
  *H04W 80/02* (2009.01)

(56) References Cited

U.S. PATENT DOCUMENTS

| | | | | |
|---|---|---|---|---|
| 8,055,207 | B2* | 11/2011 | Behzad | H04B 1/0067 375/267 |
| 8,068,794 | B2* | 11/2011 | Rofougaran | H04B 1/406 375/295 |
| 8,160,043 | B2* | 4/2012 | Wang | H04B 1/707 370/335 |
| 8,554,239 | B2* | 10/2013 | Zhang | H04B 1/0003 455/450 |
| 8,891,420 | B2* | 11/2014 | Chen | H04L 69/18 370/310 |
| 8,934,452 | B2* | 1/2015 | Zou | H04W 56/0045 370/331 |
| 9,258,629 | B2* | 2/2016 | Graves | H04Q 11/0005 |
| 9,270,346 | B2* | 2/2016 | Ahmadi | H04B 7/024 |
| 9,301,198 | B2* | 3/2016 | Li | H04W 28/08 |
| 9,439,243 | B2* | 9/2016 | Liu | H04W 88/12 |
| 9,516,521 | B2* | 12/2016 | Sirotkin | H04W 24/02 |
| 9,596,707 | B2* | 3/2017 | Zhu | H04W 28/065 |
| 9,713,086 | B2* | 7/2017 | Choi | H04W 52/0206 |
| 9,998,310 | B2* | 6/2018 | Barbieri | H04L 25/02 |
| 10,045,333 | B2* | 8/2018 | Hahn | H04W 28/0278 |
| 10,075,778 | B2* | 9/2018 | Peroulas | H04W 72/1268 |
| 10,097,391 | B2* | 10/2018 | Fertonani | H04L 25/02 |
| 10,149,343 | B2* | 12/2018 | Pasupuleti | H04W 72/08 |
| 10,194,311 | B2* | 1/2019 | Lee | H04W 76/30 |
| 10,218,539 | B2* | 2/2019 | Kloper | H04L 12/64 |
| 10,284,263 | B2* | 5/2019 | Ahmadi | H04B 7/024 |
| 10,321,394 | B2* | 6/2019 | Peng | H04W 24/02 |
| 10,355,895 | B2* | 7/2019 | Barbieri | H04L 12/4604 |
| 10,405,344 | B2* | 9/2019 | Shanmugaraju | H04W 88/12 |
| 2005/0202823 | A1* | 9/2005 | Shaheen | H04W 36/0061 455/436 |
| 2006/0094478 | A1 | 5/2006 | Kim et al. | |
| 2008/0139156 | A1* | 6/2008 | Behzad | H04B 1/0067 455/296 |
| 2008/0205366 | A1* | 8/2008 | Wang | H04B 1/707 370/342 |
| 2008/0207139 | A1* | 8/2008 | Rofougaran | H04B 1/406 455/91 |
| 2009/0196301 | A1 | 8/2009 | Parsons | |
| 2010/0016021 | A1* | 1/2010 | Xu | H04L 1/22 455/560 |
| 2012/0202507 | A1* | 8/2012 | Zhang | H04B 1/0003 455/450 |
| 2012/0224541 | A1* | 9/2012 | Yoshiuchi | H04W 16/10 370/329 |
| 2013/0142054 | A1* | 6/2013 | Ahmadi | H04B 7/024 370/252 |
| 2013/0235726 | A1* | 9/2013 | Frederiksen | H04W 36/22 370/235 |
| 2014/0023035 | A1* | 1/2014 | Zou | H04W 56/0045 370/331 |
| 2014/0078906 | A1* | 3/2014 | Chen | H04L 69/18 370/237 |
| 2014/0079022 | A1* | 3/2014 | Wang | H04W 36/22 370/331 |
| 2014/0086154 | A1* | 3/2014 | Sajadieh | H04W 8/18 370/329 |
| 2014/0133446 | A1* | 5/2014 | Liu | H04W 88/12 370/329 |
| 2014/0161447 | A1* | 6/2014 | Graves | H04Q 11/0005 398/48 |
| 2014/0226736 | A1* | 8/2014 | Niu | H04L 27/2628 375/260 |
| 2014/0269322 | A1* | 9/2014 | Li | H04W 28/08 370/236 |
| 2015/0029913 | A1 | 1/2015 | Zhou et al. | |
| 2015/0105084 | A1* | 4/2015 | Bontu | H04W 36/0072 455/437 |
| 2015/0237571 | A1* | 8/2015 | Laraqui | H04W 24/10 370/332 |
| 2015/0264726 | A1* | 9/2015 | Zhu | H04W 28/065 370/329 |
| 2015/0319132 | A1* | 11/2015 | Moon | H04L 61/255 709/245 |
| 2015/0373574 | A1* | 12/2015 | Gordon | H04L 41/5067 370/252 |
| 2016/0014686 | A1* | 1/2016 | Cho | H04W 48/18 370/328 |
| 2016/0029205 | A1* | 1/2016 | Sirotkin | H04W 24/02 455/418 |
| 2016/0095108 | A1* | 3/2016 | Ryoo | H04L 5/0007 370/329 |
| 2016/0142954 | A1* | 5/2016 | Cho | H04W 36/36 370/331 |
| 2016/0182691 | A1* | 6/2016 | Perreault | H04L 61/6086 709/230 |
| 2016/0183248 | A1* | 6/2016 | Niu | H04B 7/0413 370/329 |
| 2016/0227396 | A1* | 8/2016 | Lee | H04W 76/30 |
| 2016/0234773 | A1* | 8/2016 | Choi | H04W 52/0206 |
| 2016/0248483 | A1* | 8/2016 | Ahmadi | H04B 7/024 |
| 2016/0295572 | A1* | 10/2016 | Hahn | H04W 76/10 |
| 2016/0316378 | A1* | 10/2016 | Su | H04W 24/02 |
| 2016/0338036 | A1* | 11/2016 | Pasupuleti | H04W 72/08 |
| 2016/0380962 | A1* | 12/2016 | Johnson | H04W 88/16 370/328 |
| 2017/0188182 | A1* | 6/2017 | Jin | H04B 1/0014 |
| 2017/0188400 | A1* | 6/2017 | Tian | H04W 74/00 |
| 2017/0230871 | A1* | 8/2017 | Rangaswamy | H04L 61/2007 |
| 2017/0303286 | A1* | 10/2017 | Sang | H04W 76/15 |
| 2017/0366679 | A1* | 12/2017 | Mohamed | H04M 15/43 |
| 2017/0373890 | A1* | 12/2017 | Fertonani | H04L 25/02 |
| 2018/0007587 | A1* | 1/2018 | Feldman | H04L 65/1006 |
| 2018/0007594 | A1* | 1/2018 | Ranta-Aho | H04W 88/06 |
| 2018/0013581 | A1* | 1/2018 | Fertonani | H04L 25/02 |
| 2018/0013597 | A1* | 1/2018 | Barbieri | H04L 25/02 |
| 2018/0034669 | A1* | 2/2018 | Barbieri | H04L 25/02 |
| 2018/0035445 | A1* | 2/2018 | Franklin | H04W 72/1215 |
| 2018/0041925 | A1* | 2/2018 | Yilmaz | H04W 36/0033 |
| 2018/0041930 | A1* | 2/2018 | Hampel | H04L 63/06 |
| 2018/0048700 | A1* | 2/2018 | Gummadi | H04L 5/0023 |
| 2018/0049079 | A1* | 2/2018 | Ozturk | H04W 76/27 |
| 2018/0077006 | A1* | 3/2018 | Cui | H04L 41/0668 |
| 2018/0183717 | A1* | 6/2018 | Panchal | H04L 47/2475 |
| 2018/0248787 | A1* | 8/2018 | Rajagopal | H04W 72/087 |
| 2018/0288659 | A1* | 10/2018 | Jamadagni | H04W 4/06 |
| 2018/0310352 | A1* | 10/2018 | Wiberg | H04W 72/04 |
| 2018/0317243 | A1* | 11/2018 | Lin | H04L 43/08 |
| 2018/0332614 | A1* | 11/2018 | Shanmugaraju | H04W 74/04 |
| 2018/0352468 | A1* | 12/2018 | Futaki | H04W 88/10 |
| 2018/0376383 | A1* | 12/2018 | Belghoul | H04W 36/28 |
| 2019/0021081 | A1* | 1/2019 | Ljung | H04L 5/0044 |
| 2019/0036737 | A1* | 1/2019 | Kloper | H04L 12/64 |
| 2019/0059089 | A1* | 2/2019 | Marinier | H04W 76/15 |
| 2019/0098566 | A1* | 3/2019 | Li | H04W 88/06 |
| 2019/0173691 | A1* | 6/2019 | Kloper | H04L 12/64 |
| 2019/0253107 | A1* | 8/2019 | Ahmadi | H04B 7/024 |
| 2019/0254047 | A1* | 8/2019 | Ahmed | H04L 47/30 |
| 2020/0236592 | A1* | 7/2020 | Berg | H04L 41/0886 |

FOREIGN PATENT DOCUMENTS

| | | | | |
|---|---|---|---|---|
| CN | 105634794 | B * | 6/2018 | |
| CN | 108306915 | A * | 7/2018 | |
| CN | 108347740 | A * | 7/2018 | |
| EP | 2611229 | A1 * | 7/2013 | H04W 28/0289 |
| EP | 2611229 | A4 * | 9/2013 | H04W 72/0486 |
| EP | 2753142 | A1 * | 7/2014 | H04W 88/085 |
| EP | 2854444 | A1 | 1/2015 | |
| EP | 2753142 | B1 * | 8/2015 | H04W 88/085 |
| EP | 2611229 | B1 * | 11/2015 | H04W 28/0289 |
| EP | 3373645 | A1 * | 9/2018 | H04W 28/06 |
| EP | 3373645 | A4 * | 11/2018 | H04W 28/06 |
| EP | 3586561 | A1 * | 1/2020 | |

(56) References Cited

FOREIGN PATENT DOCUMENTS

| RU | 2007111751 A | 12/2008 | |
|---|---|---|---|
| WO | WO-2013081696 A1 * | 6/2013 | ........... H04B 17/318 |
| WO | WO-2013123670 A1 * | 8/2013 | ............ H04W 28/08 |
| WO | 2013152743 A1 | 10/2013 | |
| WO | 2014185953 A1 | 11/2014 | |
| WO | WO-2015053923 A1 * | 4/2015 | ........ H04W 36/0072 |
| WO | WO-2015138075 A1 * | 9/2015 | .......... H04W 28/065 |
| WO | 2015145255 A2 | 10/2015 | |
| WO | WO-2016145371 A2 * | 9/2016 | .............. H04L 27/26 |
| WO | WO-2016145371 A3 * | 12/2016 | ............ H04L 27/26 |
| WO | WO-2018031181 A1 * | 2/2018 | ........... H04L 5/0023 |
| WO | WO-2018063998 A1 * | 4/2018 | ............. H04B 7/022 |
| WO | WO-2018153427 A1 * | 8/2018 | ............ H04L 5/0035 |
| WO | WO-2019027711 A1 * | 2/2019 | ........... H04B 7/0848 |

* cited by examiner

METHOD AND DEVICES FOR CONNECTING A USER EQUIPMENT WITH A RADIO ACCESS NETWORK IN A TELECOMMUNICATION NETWORK

TECHNICAL FIELD

The present invention is generally related to radio access networks, more specifically to the act of connecting a User Equipment, UE, to Baseband Units comprised by an access network.

BACKGROUND

A radio access network, RAN, is the part of a telecommunication network that is responsible for connecting User Equipment, UEs, to the core network. The radio access network implements a certain radio access technology, such as third generation, 3G, fourth generation, 4G, and Long Term Evolution, LTE.

Different types of radio access network exist. For example, the Universal Terrestrial Radio Access Network, UTRAN, is a term used for the network and equipment that connect UE's to the public Internet. The UTRAN comprises base stations which are referred to as Node B's and Radio network controllers. Another example is the Evolved Universal Terrestrial Radio Access Network, E-UTRAN, which is initially meant as a replacement of the Universal Mobile Telecommunications System, UMTS. An Evolved Node B is the element in the E-UTRAN that is the evolution of the Node B in the UTRAN access network.

Multi-point transmission is one of the techniques to improve capacity and robustness in a telecommunication network. Here, communications between the RAN and the device involves more than one network Transmission and Reception Point, TRP.

Beamforming is another technique that can be used in telecommunication networks, which requires beam tracking and other forms of beam management. In particular, in a multi TRP scenario, beamforming may require that the device is configured differently depending on which TRP is used for communication. Thus, multi-point transmission may require beam-management procedures related to switching between communication over one or several TRPs, and related to switching communication between different TRPs. Such beam-management procedures can benefit from tight physical-layer coordination between the TRPs.

Telecommunication networks use control signalling on several levels. The physical layer uses per-Transmission Time Interval, TTI, control signalling from the RAN to UE's to indicate scheduling of downlink and uplink data transmissions, including information about which UE is scheduled, what transmission format should be used, and several other parameters. Such messages are often referred to as downlink or uplink grants. Higher layers use control messages from the RAN to the UE's to configure the devices for different communication scenarios.

One case of multi-point transmission occurs when the involved TRPs are connected to the same network node, e.g. baseband unit, BBU. In such cases, the different TRPs can be highly coordinated. Coordination can involve e.g. combined link adaptation and scheduling, combined physical-layer processing, and combined packet-control functions such as buffering, segmentation, and retransmissions. Such cases are often referred to as coordinated multipoint transmission, or CoMP.

Typically, a single protocol stack is used, configured with one or more radio bearers. Each radio bearer has an Radio Link Control, RLC, entity and a Packet Data Convergence Protocol, PDCP, entity.

Another case of multi-point transmission occurs when the involved TRPs are connected to different BBUs. In such cases, the different TRPs are often less coordinated. For instance, the TRPs may be scheduled and adapted independently, physical-layer processing may be performed independently, and packet control functions such as buffering, segmentation, and retransmissions may be performed independently. Such cases are often referred to as dual connectivity, where different connections typically use different TRPs. Typically, two protocol stacks are used, configured with one or more radio bearers. Each radio bearer has two RLC entities, one per stack, and a single PDCP entity.

Existing CoMP solutions in LTE require that the involved TRPs have coordinated packet control functions, and allow for coordination of scheduling and physical-layer processing. The device is typically configured for a single connection, and the network can choose to use different TRPs without reconfiguring the device.

Existing dual connectivity solutions in LTE assume that the connections operate independently regarding the physical layer, L1, and the lower parts of the protocol layers, RLC and Medium Access Control, MAC. The UE is typically configured with two connections, each with independent RLC, MAC, and L1 entities.

One of the drawbacks of existing technology is that it is difficult to achieve tight coordination of link adaptation, scheduling and physical-layer processing, without also requiring tight coordination of packet-control functions. This may limit tight TRP coordination to scenarios where the TRPs are connected to the same network nodes, thereby limiting the opportunities for coordination gains.

SUMMARY

It is an object to provide for a method of connecting a User Equipment, UE, with a radio access network, RAN.

It is another object to provide for a baseband unit, BBU, as well as a UE, for supporting the connecting of the UE with the RAN.

In a first aspect, there is provided a method of connecting a User Equipment, UE, with a radio access network, RAN, in a telecommunication network, wherein said RAN comprises a plurality of Baseband Units, BBU's, wherein said UE comprises two multi layered protocol stacks that can be used for same type of connections with BBU's and wherein said UE is connected to a first BBU using a first of said two protocol stacks for communication with said first BBU.

The method comprising the steps of receiving, by a second BBU, from a network node in said telecommunication network, a Stack Selector parameter, wherein said Stack Selector parameter indicates which of said two protocol stacks are to be used by said UE for said communication with said second BBU, and transmitting, by said second BBU, to said UE a downlink grant message, wherein said downlink grant message comprises said Stack Selector parameter.

The method is at least based on the insight that two protocol stacks are introduced for a single connection. That is, for one particular connection, the UE may utilize any of the two protocol stacks.

One of the advantages of the presented method is that it allows for more flexible choices of coordination. In particular, it decouples the handling of protocol stacks from other coordination functions. As a results, multi-point transmission across BBUs can be performed without having necessarily impact on the physical layer.

The Stack Selector parameter can be implemented as a one bit parameter, which is used for indicating which of the two protocol stacks is to be used for a downlink or uplink transmission.

In a single-BBU transmission scenario, i.e. in a scenario in which the UE is connected to a single BBU, the downlink and uplink grants may use the same value for the stack selector parameter, thereby indicating that the same protocol stack is used. For instance, a value of "0". Thus, for any given radio bearer, a single RLC entity is used in the BBU and a single RLC entity is used in the device. Regardless of this, multiple TRPs may be involved in the communication; any single transmission can use any TRP or even multiple TRPs.

In a dual-BBU transmission scenario, each BBU may use a specific value for the stack selector parameter. For instance, the first BBU may use the value "0" and the second BBU may use the value "1". For any given radio bearer, each BBU has a single RLC entity, while the device has two RLC entities, one for each stack, i.e. one for each value of the stack selector parameter. Thus, when the first BBU schedules a downlink transmission for that radio bearer, it fetches data from its RLC entity and indicates the value "0" as the stack selector parameter in the downlink grant, while the device delivers the received data to the RLC entity associated with the stack selector parameter having value "0".

Similarly, the second BBU may use the value "1" as the stack selector parameter. The two BBUs may use one or several TRPs each. Both BBUs may schedule downlink or uplink data in the same TTI, each using their stack selector parameter and corresponding RLC stacks.

One of the advantages of the proposed method is that the RLC layer of the protocol stacks, i.e. the Radio Link Control layer, is effectively made aware of the BBU that is connected to the UE for that particular connection.

It is noted that the advantages of the present disclosure are mainly disclosed in relation to the Long Term Evolution, LTE, radio access network. The advantages are, however, also obtained in other types of radio access networks, like the GSM EDGE Radio Access Network, the Universal Terrestrial Radio Access Network, or anything alike.

In accordance with the present disclosure, the BBU is a baseband processing unit. A typical wireless base station, like the eNodeB, comprises the baseband processing unit and a Radio Frequency, RF, processing unit. The BBU may be placed in an equipment room and connected with the RF processing unit via an optical fiber. The BBU is responsible for communication through the physical interface.

In accordance with the present disclosure, a same type of connection means that the connections are based on the same radio access technology, i.e. cellular connection. This could, for example, be two connections based on the fifth Generation, 5G, New Radio, NR, technology or two connections based on the Long Term Evolution, LTE, technology.

In an example, the step of receiving said Stack Selector parameter comprises any of:
  receiving, by said second BBU, from said first BBU said Stack Selector parameter;
  receiving, by said second BBU, from a central network node arranged for coordinating Stack Selector parameters among said plurality of BBU's, said Stack Selector parameter.

It is noted that, in accordance with the present disclosure, the coordination of the stack selector parameter may be performed by the BBU's itself or may be performed by a central network node, for example a node in the radio access network or in the core network.

The central network node may, alternatively, also be the Mobility Management Entity, MME, in the core network of the telecommunication network, or the Service Gateway, SGW, in the core network of the telecommunication network.

The advantage of a central network node is that it is less likely that errors occur due to a fault in a synchronization process of the BBU's itself. For example, if a particular BBU starts using a value for the stack selector parameter which is already in use by another BBU, errors may arise. As such, two possible approaches may be taken into account.

In a first approach, the intelligence for the coordination of the stack selector parameters is distributed among the BBU's. Each of the BBU's should then be aware of the values for the stack selector parameter for particular UE's for the other BBU's in the same radio access network. This is particularly true for BBU's that are adjacent to each other, i.e. BBU's having coverage cells that are adjacent, or partly overlap, with each other, as it is likely that these BBU's could serve a UE at the same time.

In another approach, the intelligence for the coordination of the stack selector parameters is centralized in a central network node. In this case, the probability that errors occur due to a faulty synchronization scheme is reduced. The central network node is responsible for maintaining a list of BBU's and UE's that are connected thereto, and for maintaining which BBU uses which stack in the connected UE's for communication with those UE's.

In a further example, the said Stack Selector parameter indicates a different protocol stack to be used for communication by said second BBU with said UE compared to said protocol stack used for communication by said first BBU with said UE.

In accordance with the present disclosure, multiple scenarios may exist in which the stack selector parameter can be used. In a first scenario, the second BBU is to use a different protocol stack for communication with the UE compared to the protocol stack used by the first BBU with the UE.

The above entails, for example, that the UE, for example a dual connectivity capable UE, has a first connection with a first BBU, wherein that first BBU uses a stack selector parameter with a value "0" such that the UE is able to determine that communication received with that parameter are originated from the first BBU. Then, the UE may also get connected to, or be handed-over to, a second BBU. In order to distinguish, especially to the RLC layer of the protocol stacks, received communications from the two BBU's, the second BBU may use a different value "0" for the stack selector parameter in its communication with the UE. The UE can then, based on the stack selector parameter, deliver the message to the RLC layer of the corresponding protocol stack, i.e. the protocol stack that corresponds to the stack selector parameter.

In a further example, the Stack Selector parameter indicates a same protocol stack to be used for communication by said second BBU with said UE as to said protocol stack used for communication by said first BBU with said UE, wherein said method further comprises the steps of:
  receiving, by said second BBU, from said network node in said telecommunication network, a Stack Reset parameter, wherein said Stack Reset parameter indicates to said UE that said protocol stack corresponding to said Stack Selector parameter is to be reset;

transmitting, by said second BBU, to said UE said Stack Reset parameter.

Here, the UE may be handed over to the second BBU. A stack reset parameter may be included in the communication from the second BBU to the UE, in order to effectively handover the UE to the second BBU. The UE will notice the stack reset parameter, more specifically, the RLC layer of the protocol stack corresponding to the stack selector parameter will notice the stack reset parameter, and will subsequently reset at least the RLC layer of the protocol stack such that the protocol stack can be used for communication with the second BBU.

In a detailed example hereof, the step of transmitting said Stack Reset parameter comprises any of:

transmitting, by said second BBU, said Stack Reset parameter in said downlink grant message;

transmitting, by said second BBU, said Stack Reset parameter in a separate control message.

The inventors have found that the stack reset parameter can be transferred to the UE in at least two different ways. First, the stack reset parameter may be included in the same downlink grant message as is used for the stack selector parameter. The protocol stack corresponding to the value as provided by the stack selector parameter is then first reset and then used for subsequent communications with that particular BBU.

Another option is that the stack reset parameter is transmitted in a separate control message. In this case, it is advantage that the separate control message is transmitted to the UE before the downlink grant message is transmitted. This ensures that the corresponding protocol stack has been reset before that particular stack is coupled to a different BBU.

In a further example, the second BBU is said first BBU.

In this particular example, the UE may be a dual connectivity capable UE, wherein said UE is able to have two simultaneous connections to the same BBU. Each of those connections is then coupled to one protocol stack for efficiency purposes.

The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the methods, including the advantages thereof, correspond to the aspects which are applicable to the devices of the telecommunication network.

In a second aspect, there is provided a method of connecting a dual connectivity capable User Equipment, UE, with a radio access network, RAN, in a telecommunication network, wherein said UE comprises two multi layered protocol stacks that can be used for same type of connections with BBU's, and wherein said UE is connected to a first BBU using a first of said two protocol stacks for communication with said first BBU, said method comprising the steps of:

receiving, by said UE, from a second BBU in said RAN, a Stack Selector parameter, wherein said Stack Selector parameter indicates which of said two protocol stacks are to be used by said UE for said communication with said second BBU;

delivering, by said UE, said received downlink grant message to an RLC entity of the multi layered protocol stacks that corresponds to said Stack received Selector parameter.

The advantage of the method as disclosed above is that the UE is able to deliver the downlink grant message to the protocol stack that is coupled, i.e. that corresponds to, the BBU that sent the downlink message. More specifically, the downlink grant message is delivered to the RLC entity of the corresponding protocol stack.

This enables the UE to be effectively deployed, especially in situations wherein the UE is connected to multiple BBU's at the same time.

In an example, the method further comprises the step of:

receiving, by said UE, a further downlink grant message from the same or another BBU in said RAN, wherein said further downlink grant message comprises a further Stack Selector parameter, wherein said Stack Selector parameter indicates which other of said two protocol stacks are to be used by said UE for said communication with said second BBU;

delivering, by said UE, said received downlink scheduling control message to a further RLC entity of the another one of said two multi layered protocol stacks that corresponds to said Stack Selector parameter.

In a further example, the Stack Selector parameter indicates a different protocol stack to be used for communication by said second BBU with said UE compared to said protocol stack used for communication by said first BBU with said UE.

It is noted that, in accordance with the present invention, the two protocol stacks may be used for the same connection. That is, the protocol stacks are not directed to different technologies aspect. The protocol stacks may, for example, be used for the same, or similar, mobile connection, for example 3G or 4G, to the radio access network.

In an example, the Stack Selector parameter indicates a same protocol stack to be used for communication by said UE with said second BBU as to said protocol stack used for communication by said UE with said first BBU, wherein said method further comprises the steps of:

receiving, by said UE, from said second BBU, a Stack Reset parameter, wherein said Stack Reset parameter indicates to said UE that said protocol stack corresponding to said Stack Selector parameter is to be reset;

resetting, by said UE, at least an Radio Link Control layer of said protocol stack corresponding to said Stack Selector parameter.

In yet another example, the step of receiving said Stack Reset parameter comprises:

receiving, by said UE, said Stack Reset parameter in said downlink grant message;

receiving, by said UE, said Stack Reset parameter in a separate control message.

In another example, the second BBU is said first BBU.

In a third aspect, there is provided a second Baseband Unit, BBU, for supporting connecting a User Equipment, UE, with a radio access network, RAN, in a telecommunication network, wherein said RAN comprises a plurality of Baseband Units, BBU's, wherein said UE comprises two multi layered protocol stacks that can be used for communications with BBU's, and wherein said UE is connected to a first BBU using a first of said two protocol stacks for communication with said first BBU, said second BBU comprising:

receive equipment operable to receive from a network node in said telecommunication network, a Stack Selector parameter, wherein said Stack Selector parameter indicates which of said two protocol stacks are to be used by said UE for said communication with said second BBU;

transmit equipment operable to transmit to said UE a downlink grant message, wherein said downlink grant message comprises said Stack Selector parameter.

In accordance with the present disclosure, different aspects applicable to the above mentioned examples of the third aspect of the disclosure, including the advantages thereof, correspond to the aspects which are applicable to the first and second aspect of the disclosure.

In an example, the Stack Selector parameter indicates a same protocol stack to be used for communication by said second BBU with said UE as to said protocol stack used for communication by said first BBU with said UE, wherein:

said receive equipment is further operable to receive from said network node in said telecommunication network, a Stack Reset parameter, wherein said Stack Reset parameter indicates to said UE that said protocol stack corresponding to said Stack Selector parameter is to be reset, and said transmit equipment is further operable to transmit to said UE said Stack Reset parameter.

In a fourth aspect, there is provided a dual connectivity capable User Equipment, UE, for supporting connecting a dual connectivity capable User Equipment, UE, with a radio access network, RAN, in a telecommunication network, wherein said UE comprises two multi layered protocol stacks that can be used for communications with BBU's, and wherein said UE is connected to a first BBU using a first of said two protocol stacks for communication with said first BBU, said UE comprising:

receive equipment operable to receive from a second in said RAN, a Stack Selector parameter, wherein said Stack Selector parameter indicates which of said two protocol stacks are to be used by said UE for said communication with said second BBU;

deliver equipment operable to deliver said received downlink grant message to an RLC entity of the multi layered protocol stacks that corresponds to said Stack received Selector parameter.

In accordance with the present disclosure, different aspects applicable to the above mentioned examples of the fourth aspect of the disclosure, including the advantages thereof, correspond to the aspects which are applicable to the first, second and third aspect of the disclosure.

In accordance with the present disclosure, a dual connectivity User Equipment, UE, is an UE which is capable of having two simultaneous connections at the same time and of the same type. This means that the dual connectivity UE has, for example, two 5G NR connections to two radio base stations at the same time, or two 5G NR connections to a single radio base station at the same time. Another possibility is that the UE has two LTE connections to two eNodeB's at the same time.

In a fifth aspect, there is provided a computer program product, comprising a readable storage medium, comprising instructions which, when executed on at least one processor, cause the at least one processor to carry out the method according to any of examples as provided above.

In a sixth aspect, there is provided a second Baseband Unit, BBU, for supporting connecting a User Equipment, UE, with a radio access network, RAN, in a telecommunication network, wherein said RAN comprises a plurality of Baseband Units, BBU's, wherein said UE comprises two multi layered protocol stacks that can be used for communications with BBU's, and wherein said UE is connected to a first BBU using a first of said two protocol stacks for communication with said first BBU, said second BBU comprising:

receive module for receiving from a network node in said telecommunication network, a Stack Selector parameter, wherein said Stack Selector parameter indicates which of said two protocol stacks are to be used by said UE for said communication with said second BBU;

transmit module for transmitting to said UE a downlink grant message, wherein said downlink grant message comprises said Stack Selector parameter.

In a seventh aspect, there is provided a dual connectivity capable User Equipment, UE, for supporting connecting a dual connectivity capable User Equipment, UE, with a radio access network, RAN, in a telecommunication network, wherein said UE comprises two multi layered protocol stacks that can be used for communications with BBU's, and wherein said UE is connected to a first BBU using a first of said two protocol stacks for communication with said first BBU, said UE comprising:

receive equipment operable to receive from a second BBU in said RAN, a Stack Selector parameter, wherein said Stack Selector parameter indicates which of said two protocol stacks are to be used by said UE for said communication with said second BBU;

deliver equipment operable to deliver said received downlink grant message to an RLC entity of the multi layered protocol stacks that corresponds to said Stack received Selector parameter.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
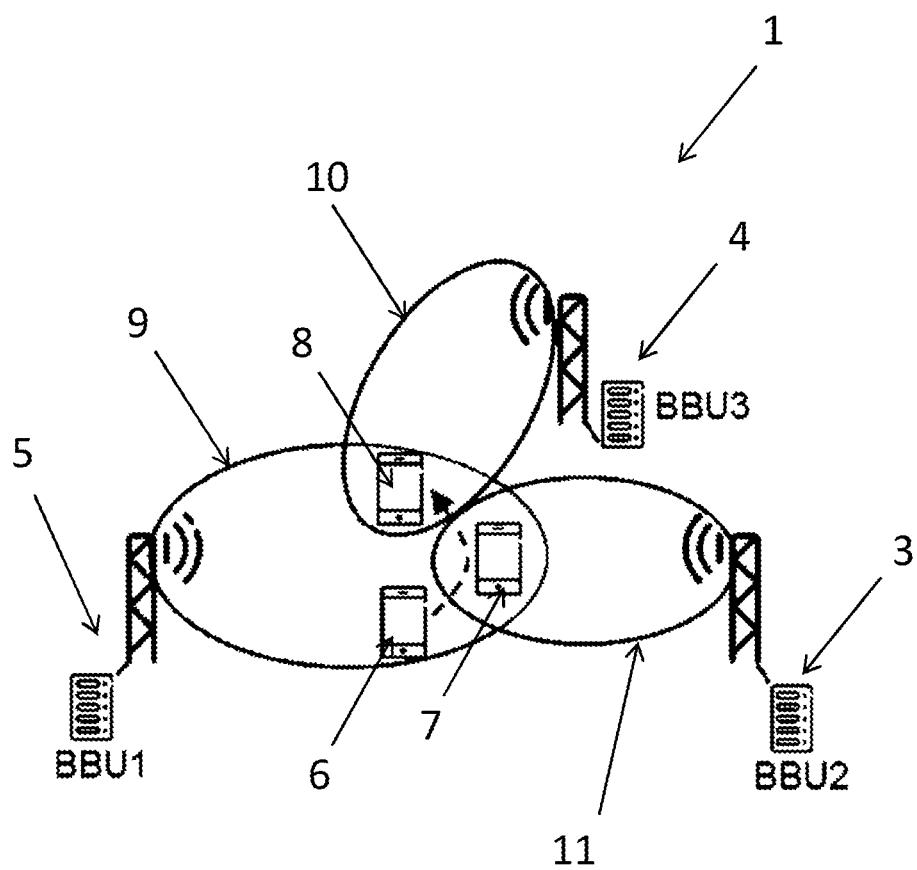
FIG. 1 is a schematic diagram illustrating a radio access network, RAN, in which a User Equipment is located.

FIG. 1 is a schematic diagram illustrating a radio access network, RAN, 1 in which a User Equipment, UE, 6, 7, 8 is located. The present disclosure is set in a telecommunication network. According to the present disclosure, the telecommunication network comprises a radio access network, RAN, 1 as well as a core network (not shown). The radio access network is responsible for direct communication with User Equipment 6, 7, 8, UE's, and for connecting the UE's to the core network. The radio access network may comprise a plurality of base stations, wherein each base station is associated with a Baseband Unit, BBU. That is, a first BBU 5 is connected to a first base station, a second BBU 3 is connected to a second base station and a third BBU 4 is connected to a third base station.

The base stations, i.e. radio access nodes may, for example, be eNodeB's. It is noted that the advantages of the present disclosure are mainly disclosed in relation to the LTE network. The advantages are, however, also obtained in other types of networks.

In accordance with the present disclosure, the UE comprises two multi layered protocol stacks that can be used for same type of connections with BBU's. The UE can, for example, be connected to a first eNodeB, and is then intended to get connected to a second eNodeB using the same radio access technology, for example a 5G New Radio, NR, connection.

The protocol stacks as disclosed in the present disclosure may be instances of a general or default protocol stack which are differentiated by settings and are handled independently of each other. This means that the protocol stacks are basically copies of each other, but can be handled independently with respect to each other. The protocol stacks may thus be technically the same, such that there are no compatibility issues whenever the UE switches from the first protocol stack to the second protocol stack, or vice versa.

It is noted that, in accordance with the present disclosure, the coverage area of the first base station, as indicated with reference numeral 9, overlaps with the coverage area of the second base station, as indicated with reference numeral 11, and with the coverage area of the third base station, as indicated with reference numeral 10.

The UE 6, 7, 8 is initially located such that only the coverage area of the first base station 9 covers the UE. The UE 6, 7, 8 then moves to a location in which it is covered by the coverage area of the first base station as well as by the coverage area of the second base station. Finally, the UE 6, 7, 8 moves to a location in which it is covered by the coverage area of the first base station as well as by the coverage area of the third base station.

In the position indicated with reference numeral 6, the UE communicates with the first base station, more specifically with the first BBU 5. Here, any downlink grant message sent from the first BBU 5 to the UE comprises a stack reset parameter as well as a stack selector parameter. De stack reset parameter indicates, to the UE, whether the protocol stack corresponding to the stack selector parameter should be reset or not. In this particular situation, the stack reset parameter is set to the value "0". This indicates to the UE that the protocol stack corresponding to the stack selector is not to be reset. The stack selector parameter has the value "0" indicating that a first of the two protocol stacks is to be used for communication between the UE and the first BBU 5.

The UE then moves from the coverage area as indicated with reference numeral 9 to a position in which it is covered by the first BBU 5 as well as by the second BBU 3. That is thus a position in which the coverage areas as indicated with reference numerals 9 and 11 overlap. This is indicated with the UE having reference numeral 7. Here, the UE can be served by the first BBU 5 as well as the second BBU 3.

In this particular situation, the UE decides that it wants to have dual connectivity, i.e. a connection to the first BBU 5 as well as a connection to the second BBU 3 at the same time. The first BBU 5 and the second BBU 3 may synchronize with each other to determine that the second BBU 3 should use a stack selector value "1" to indicate that a different protocol stack is to be used by the UE for communication with the second BBU 3 compared to the first BBU 5. Alternatively, such a determination may be performed by a central network node in the radio access network or in the core network. As such, any downlink grant message sent from the second BBU 3 to the UE will comprise a stack selector parameter having value "1" and a stack reset parameter having value "0".

Finally, the UE moves to a third position in which it is covered by the first BBU 5 as well as the third BBU 4, that it is covered by the coverages areas as indicated with reference numerals 9 and 10. In this particular situation, the UE is no longer covered by the second BBU 3. The position of the UE is now referenced to with reference numeral 8.

Here, the UE is effectively handed over from the second BBU 3 to the third BBU 4. As such, it is decided, between the second BBU 3 and the third BBU 4 mutually or by a central network node, to make sure that any downlink grant message sent from the third BBU 4 to the UE will comprises a stack selector parameter having value "1" and a stack reset parameter having value "1". This indicates to the UE that it should reset the protocol stack corresponding to the stack selector parameter having value "1", and that it, subsequent, should use that particular protocol stack for further communication with the third BBU 3.

Figure 2:
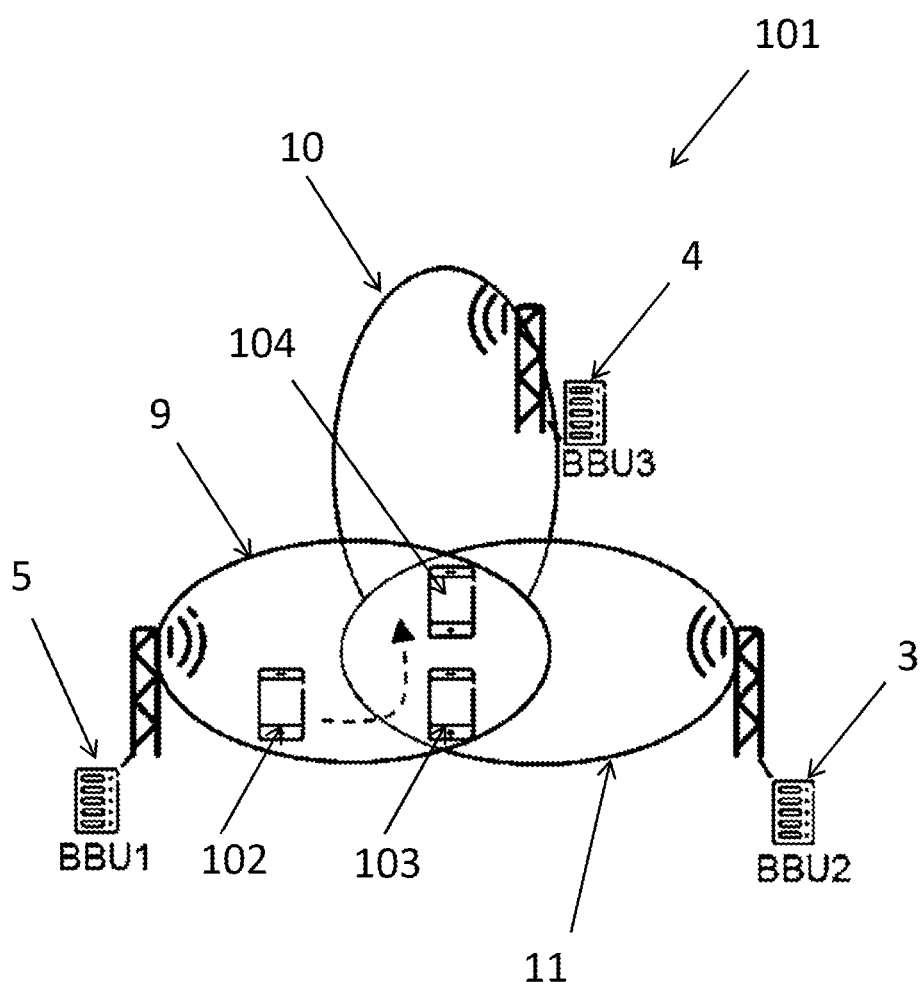
FIG. 2 is a schematic diagram illustrating another radio access network, RAN, in which a User Equipment is located.

FIG. 2 is a schematic diagram illustrating another radio access network, RAN, 101 in which a User Equipment is located. It is noted that in that aspects that are the same, are referenced to with the same reference numeral.

In this particular situation, the UE 102 is initially located within the coverage area indicated with reference numeral 9, and the UE then moves 103 to a position in which it is covered by coverage area corresponding to the first BBU 5, i.e. as indicated with reference numeral 9, as well as by the coverage area corresponding to the second BBU 3, i.e. as indicated with reference numeral 11. Finally, the UE 104 moves to a position in which it is covered by coverage areas as indicated with reference numerals 9, 11 and 10, i.e. by the first BBU 5, the second BBU 3 and the third BBU 4.

Again, downlink grant messages sent from the first BBU 5 to the UE comprise a stack selector parameter as well as a stack reset parameter. The stack selector parameter has value "0" indicating that a first stack of the two protocol stack is to be coupled to the first BBU 5. The stack reset parameter has value "0" indicating that that first stack of the two protocol stacks does not need to be reset.

Once the UE has moved to a position in which it is covered by the first BBU 5 as well as the second BBU 3, it decides that it does not desire two connections simultaneously. It is decided to handover the UE from the first BBU 5 to the second BBU 3, wherein the second BBU 3 uses the same stack in the UE. As such, at least a first downlink grant message sent from the second BBU 3 to the UE will comprises a stack selector parameter as well as a stack reset parameter. The stack selector parameter will have the same value as before, i.e. value "0". The stack reset parameter shall have value "1" to indicate, to the UE, that the protocol stack corresponding to the stack selector parameter is to be reset. That is, the same protocol stack is now used for a different BBU.

Finally, the UE moves to a position in which it is covered by all three BBU's, i.e. BBU's as indicated with reference numerals 5, 3 and 4. Here, it is decided that the UE intends to have two connections simultaneously, i.e. one connection to the second BBU 3 and one connection to the third BBU 4. As such, the third BBU 4 will send a stack selector parameter having value "1" and a stack reset parameter having value "0". This indicates, to the UE, that the second of the two protocol stacks are to be used for communication with the third BBU 4.

Figure 3:
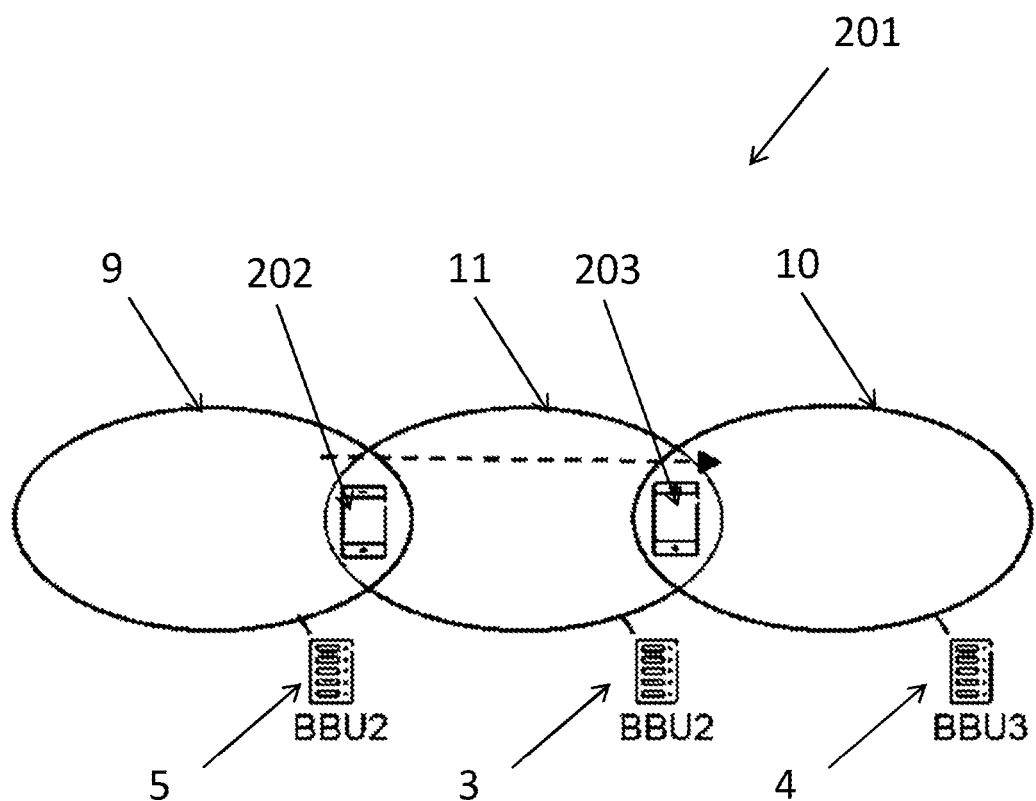
FIG. 3 is a schematic diagram illustrating yet another radio access network, RAN, in which a User Equipment is located.

FIG. 3 is a schematic diagram illustrating yet another radio access network, RAN, 201 in which a User Equipment is located.

Here, the UE moves from the first BBU2 to the second BBU 3 and then to the third BBU 4. The coverage area 9 of the first BBU 4 partly overlaps with the coverage area 11 of the second BBU 3, and the coverage area 11 of the second BBU 3 partly overlaps with the coverage area 10 of the third BBU 4.

The UE is then initially served by the first BBU 5 using stack selector parameter having value "0" and a stack reset parameter having value "0". Then, two connections simultaneously are established, i.e. between the first BBU 5 and the second BBU 3, wherein the second BBU uses the stack selector parameter having value "1" and a stack reset parameter having value "0". Finally, the third BBU 4 uses a stack selector parameter having value "0" and a stack reset parameter having value "1" to indicate, to the UE, that the first protocol stack can be reset, and that the first protocol stack is to be used for connection with the third BBU 4.

Figure 4:
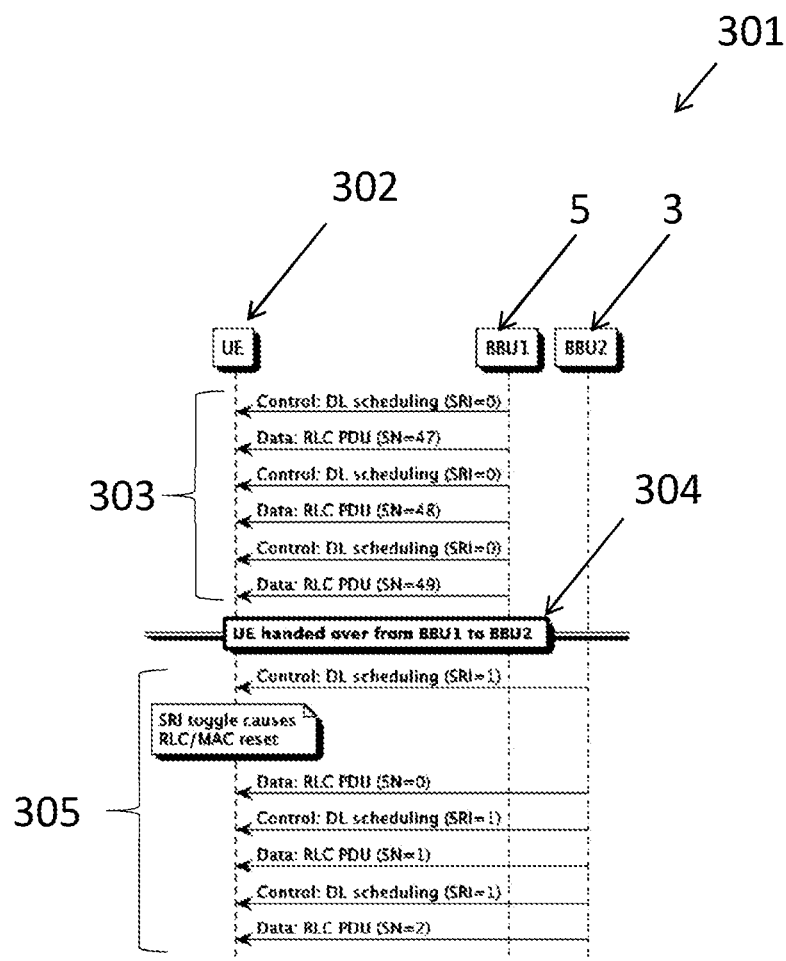
FIG. 4 is a signalling diagram illustrating an aspect of the present disclosure.

FIG. 4 is a signalling diagram 301 illustrating an aspect of the present disclosure.

Reference numeral 303 indicates all kinds of downlink traffic from the first BBU 5 to the UE 302. At least the downlink grant messages comprise a stack selector parameter as well as a stack reset parameter.

At a certain point in time, it is decided to hand over the UE 302 from the first BBU 5 to the second BBU 3. This is indicated with reference numeral 302. In this particular situation, there is not a double, simultaneous, connection between the UE 302 and the first BBU 5 as well as between the UE 302 and the second BBU 3.

Thus, in the traffic sent from the second BBU 3 to the UE 302, a Stack reset parameter having value "1" is provided which causes the UE to reset its protocol stack.

Following the above, a handing over a User Equipment, UE, in a radio access network, RAN, of a telecommunication network is provided, wherein said RAN comprises a plurality of Baseband Units, BBU's, wherein said UE comprises at least one multi layered protocol stacks that can be used for a connection with a BBU and wherein said UE is connected to a first BBU 5 using said protocol stack, said method comprising the steps of:
  receiving, by a second BBU, from a network node in said telecommunication network, an indication that said UE 302 is to be handed over to said second BBU 3, wherein said second BBU 3 is to use a stack reset parameter for indicating to said UE 302 that said protocol stack is to be reset for communication with said second BBU 3;
  transmitting, by said second BBU, to said UE 302 a downlink grant message, wherein said downlink grant message comprises said Stack Reset parameter.

The stack reset parameter is typically one bit, and its value is usually kept the same in subsequent downlink or uplink grant messages. Whenever the stack reset parameter toggles its value, i.e. changes from "0" to "1", or from "1" to 0, the RLC stack of the corresponding protocol stack is reset.

When a single BBU is used, the SRI value may be kept unchanged, e.g. a stack reset parameter having value "0".

If the serving of the device is moved from one BBU to another, the stack reset parameter may be toggled to force the UE to reset its RLC stack of the corresponding protocol stack. For instance, the UE is initially served by the first BBU 5 using a stack reset parameter having value "0". At a certain time, the device is handed over to the second BBU 3, which has a separate RLC stack, uncoordinated with the first BBU 5. Therefore, the RLC is to be reset. The first BBU 5 stops serving the UE and the second BBU 3 starts serving the UE, now using a stack reset parameter having value "1". When the UE receives a grant with a stack reset parameter having value "1", it resets its RLC stack accordingly.

A combination of the stack selector parameter and the stack reset parameter can be used when several BBUs are involved. Each stack selector parameter is then associated with its own stack reset parameter, and toggling of the stack reset parameter is detected separately for grant messages with stack selector parameter having value "0" and for grant messages with selector parameter having value "1".

In one example, a UE is initially served by the first BBU and by the second BBU. The first BBU uses a stack selector parameter having value "0", i.e. SS=0, and a stack reset parameter having value "0", i.e. SRI=0, while the second BBU uses SS=1 and SRI=0. At a certain time, the UE is handed over from the second BBU to the third BBU, while the first BBU continues to serve the UE. The third BBU uses SS=1 and SRI=1, while the first BBU continues to use SS=0 and SRI=0. As a result, the RLC stack associated with SS=1 will be reset, while the RLC stack associated with SS=0 will be unaffected.

Figure 5:
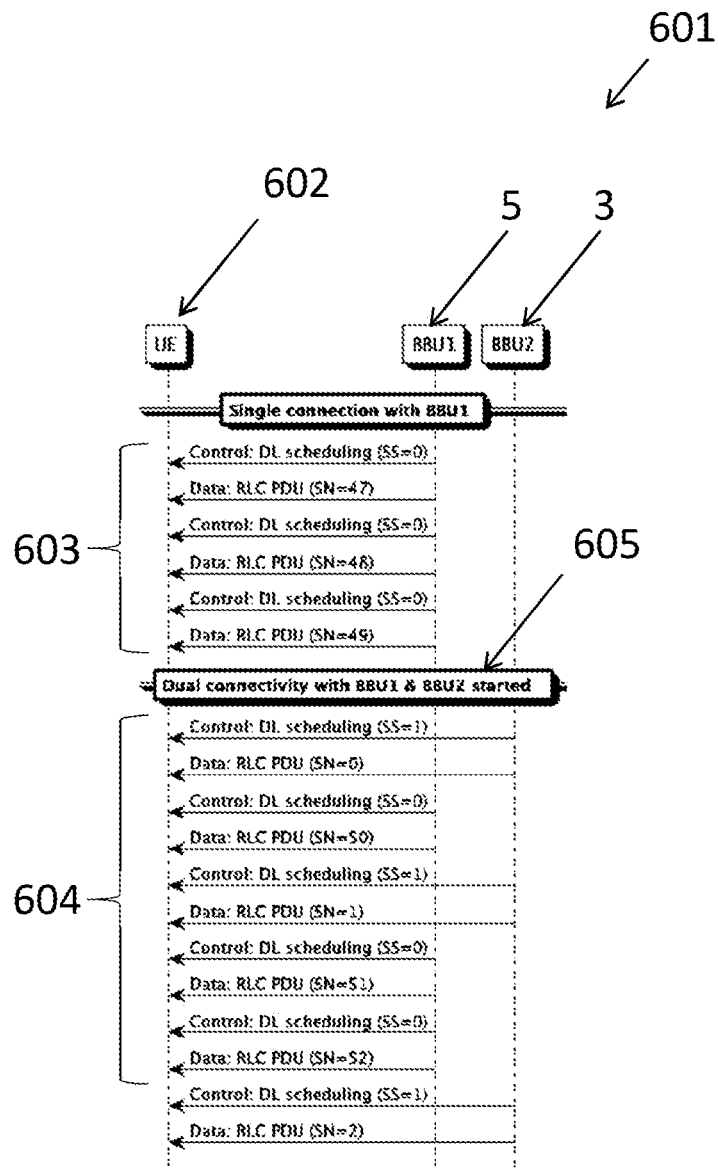
FIG. 5 is a signalling diagram illustrating yet another aspect of the present disclosure.

FIG. 5 is a signalling diagram 601 illustrating yet another aspect of the present disclosure.

Here, initially, the UE 602 is connected to the first BBU 5 only. The downlink grant messages sent from the first BBU 5 to the UE 602 comprise the stack selector parameter, wherein the stack selector parameter has a value "0" indicating, to the UE 602, that a first protocol stack is to be used for communication with the first BBU 5.

At a certain point in time, a dual connectivity 605 is started, i.e. the UE 602 intends to have a connection with the first BBU 5 as well as with the second BBU 3 at the same time.

In this particular situation, the second BBU 3 sends downlink grant messages comprising a stack selector parameter having a different value compared to the value used by the first BBU 5. The second BBU 3 uses, for example, a stack selector parameter having value "1".

As mentioned above, any BBU may use the stack selector parameter, i.e. SS, and/or the stack reset parameter, i.e. SRI.

An alternative to the SRI is to introduce a separate control message to indicate RLC reset. In one example, the RLC reset control message is used without the SS. In this case the RLC reset message is sent to the UE when it is handed over from one BBU to another. During the period when the RLC reset message is sent, the RLC cannot be reliably used since it is not known whether it has been reset yet. It is not until a confirmation, e.g., via an RLC reset confirm message, has been received at the network that the RLC stack can be used again.

In another example, the RLC reset control message is used together with SS. In this example, each RLC reset control message indicates which SS should be reset. Initially, the UE is served by BBU1 using SS=0 and its associated RLC stack. At this time, the RLC stack associated with SS=1 is unused, in the same state as if it had been reset. At a certain time, the UE is handed over from the first BBU to the second BBU, and the second BBU starts to send grant messages using SS=1. As a result, the RLC stack associated with SS=1 is used. Next, an RLC control message is sent to the UE, indicating that the RLC stack associated with SS=0 should be reset. At this point, the device is ready to at any time be handed over to another BBU, e.g. the third BBU, using the RLC stack associated with SS=0.

Figure 6:
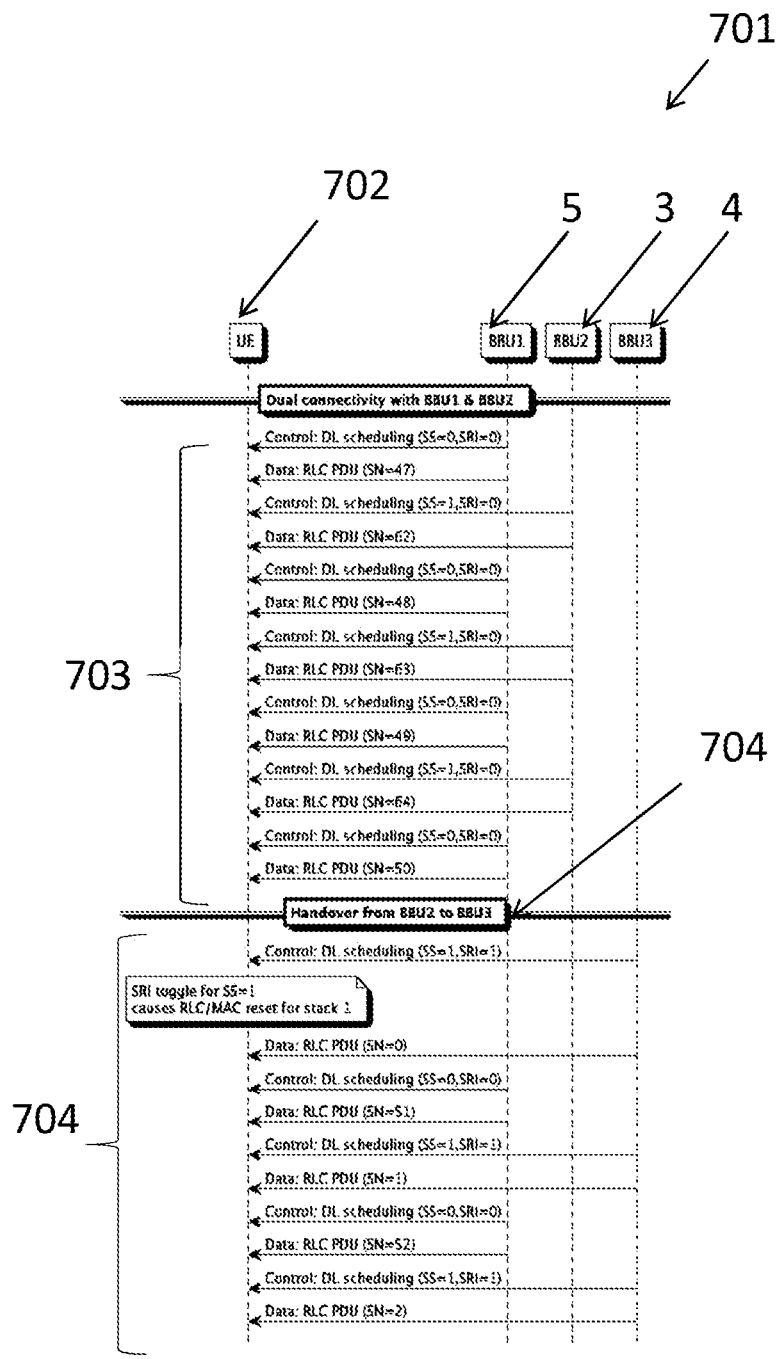
FIG. 6 is a signalling diagram illustrating an aspect of the present disclosure.

FIG. 6 is a signalling diagram 701 illustrating an aspect of the present disclosure.

Here, the UE 701, initially, has a dual connectivity connection with the first BBU 5 as well as with the second BBU 3. That is, the first BBU uses SS=0, and the second BBU uses SS=1 in the grant messages sent to the UE 702.

After a while, it is decided to hand over the UE 702 from the second BBU 3 to the third BBU 4. This is indicated with reference numeral 704. To accomplish that, the third BBU 4 sends downlink grant messages to the UE 702, wherein the downlink grant messages comprise the stack selector parameter, i.e. SS=1, as well as the stack reset parameter, i.e. SRI=1. This indicates, to the UE, that the stack corresponding to the stack selector parameter having value "1" is to be reset.

When a BBU starts to serve a UE 702, the BBU may need to know what SS and SRI to use. If the UE is initially served by the first BBU 5, and is then going to be served by the second BBU 3, then the first BBU 5 can send information on suitable values for SS and SRI to use by the first BBU. If the UE is to be served by both the first BBU and the second BBU simultaneously, then the first BBU can indicate to the second BBU to use an SS that differs from the SS that the first BBU uses, thereby causing the UE to use different RLC/MAC stacks in its communication with the first BBU and the second BBU.

If, on the other hand, the UE is to be handed over directly, without simultaneous connection to the first BBU and the second BBU, then the first BBU can indicate to the second BBU to use the same SS that the first BBU is using, but to use the opposite value of SRI compared to the first BBU, thereby letting the UE use the same RLC/MAC stack but causing it to be reset.

If the UE is initially served by both the first BBU and the second BBU, and is then going to be served by the first BBU and the third BBU, then either of the first BBU or the second BBU, or even both, can indicate to the third BBU what values to use for SS and SRI.

An alternative is to coordinate the use of SS and SRI from a central network node. The central network node would keep track of what SS and SRI is used by each BBU serving a UE. When a new BBU is to be serving the UE, the central node informs the new BBU what values to use for SS and SRI.

Figure 7:
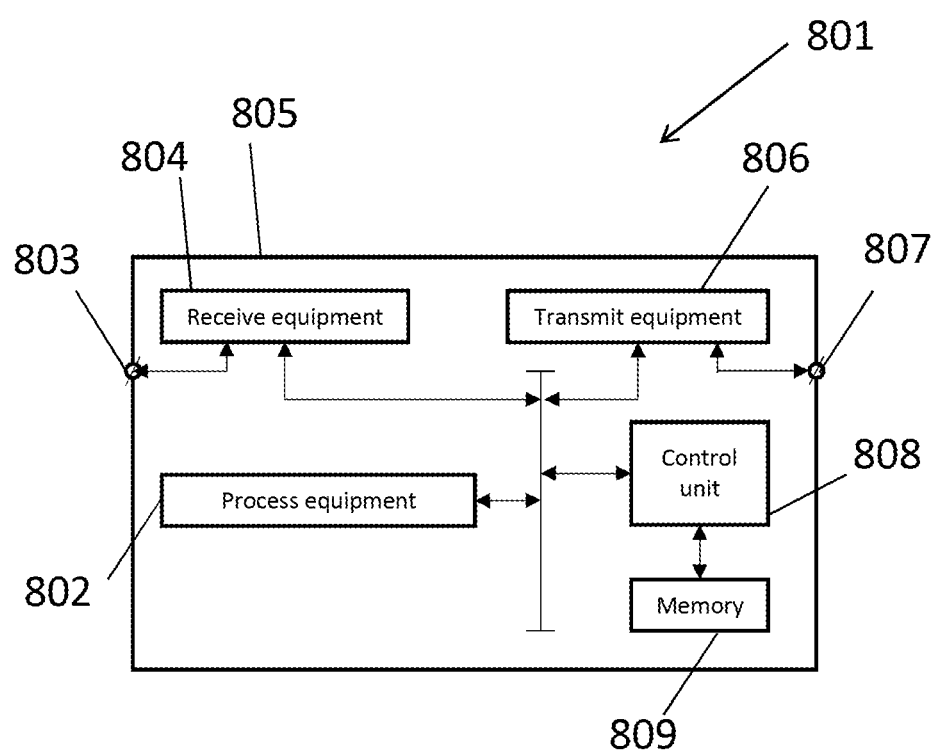
FIG. 7 is a schematic diagram illustrating an embodiment of a second Baseband Unit, BBU.

FIG. 7 is a schematic diagram illustrating an embodiment of a second Baseband Unit, BBU 801.

The second Baseband Unit, BBU, 801 is used for supporting connecting a User Equipment, UE, with a radio access network, RAN, in a telecommunication network, wherein said RAN comprises a plurality of Baseband Units, BBU's, wherein said UE comprises two multi layered protocol stacks that can be used for communications with BBU's, and wherein said UE is connected to a first BBU using a first of said two protocol stacks for communication with said first BBU.

The second BBU having a housing 805, and comprises:
receive equipment 804 operable to receive from a network node in said telecommunication network, a Stack Selector parameter, wherein said Stack Selector parameter indicates which of said two protocol stacks are to be used by said UE for said communication with said second BBU;
transmit equipment 806 operable to transmit to said UE a downlink grant message, wherein said downlink grant message comprises said Stack Selector parameter.

Here, incoming data packets, or messages, pass through the input terminal 803 before they reach the receive equipment 804, or receiving module. Outgoing data packets or messages pass or are sent by the transmit equipment 806, or transmit module, via the output terminal 807.

The second BBU 801 further comprises a control unit 808 and a memory 809, which control unit 808 is connected to the receive equipment 804, the transmit equipment 806 and the process equipment 802 via a bus connection or the like.

Figure 8:
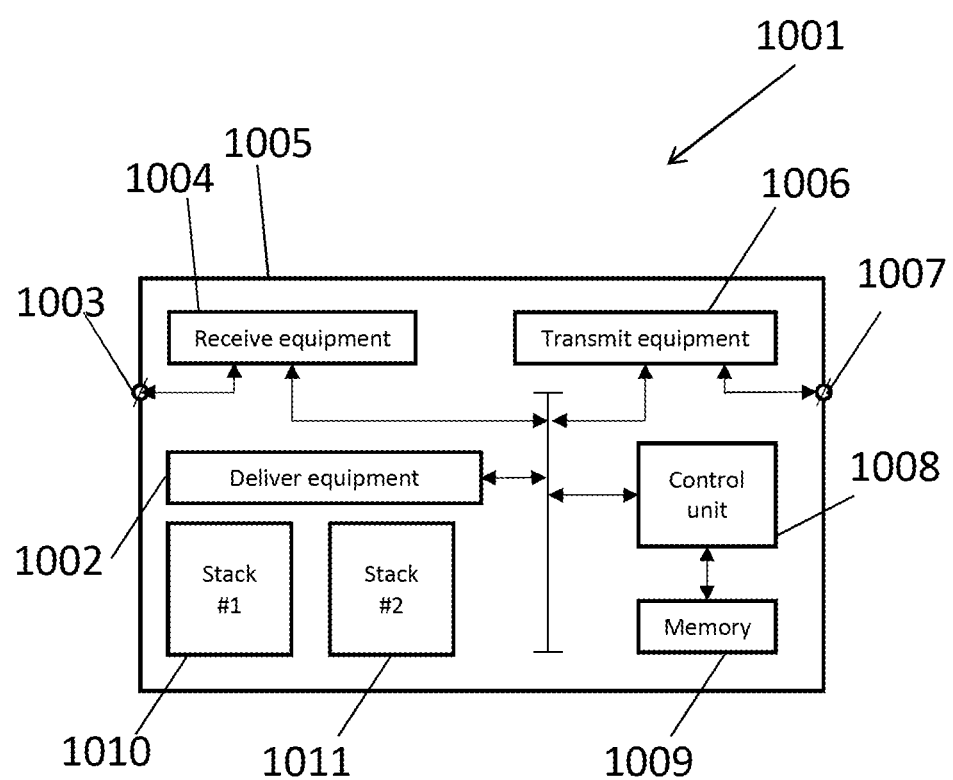
FIG. 8 is a schematic diagram illustrating an embodiment of a User Equipment, UE.

FIG. 8 is a schematic diagram illustrating an embodiment of a User Equipment, UE.

A dual connectivity capable User Equipment, UE 1001, for supporting connecting a dual connectivity capable User Equipment, UE 1001, with a radio access network, RAN, in a telecommunication network, wherein said UE 1001 comprises two multi layered protocol stacks that can be used for communications with BBU's, and wherein said UE 1001 is connected to a first BBU using a first of said two protocol stacks 1010, 1011 for communication with said first BBU.

The UE 1001 comprising:
receive equipment 1004 operable to receive from a second BBU in said RAN, a Stack Selector parameter, wherein said Stack Selector parameter indicates which of said two protocol stacks 1010, 1011 are to be used by said UE 1001 for said communication with said second BBU;
deliver equipment 1002 operable to deliver said received downlink grant message to an RLC entity of the multi layered protocol stacks that corresponds to said Stack received Selector parameter.

Here, incoming data packets, or messages, pass through the input terminal 1003 before they reach the receive equipment 1004, or receiving module. Outgoing data packets or messages pass or are sent by the transmit equipment 1006, or transmit module, via the output terminal 1007.

The UE 1001 further comprises a control unit 1008 and a memory 1009, which control unit 1008 is connected to the receive equipment 1004, the transmit equipment 1006 and the deliver equipment 1002 via a bus connection or the like.

One of the advantages of the present disclosure is that it allows for more flexible choices of coordination. In particular, it decouples the handling of protocol stacks from other coordination functions. As a result, multi-point transmission across BBUs can be performed without impact on the physical layer. By using, for example, bit toggling to indicate protocol stack reset, the reset is reliable yet faster than using separate message for reset.

Thus, an efficient signaling method for stack selection and stack reset is provided which enables serving a UE from different network nodes, i.e. BBUs, with low overhead, low latency, and high reliability. Decoupling stack management from other functions allows network protocol processing to be flexibly deployed Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The present disclosure is not limited to the embodiments as disclosed above, and can be modified and enhances by those skilled in the art beyond the scope of the present disclosure as disclosed in the appended claims without having to apply inventive skills.

The invention claimed is:

1. A method of connecting a User Equipment (UE) with a radio access network (RAN) in a telecommunication network, wherein the RAN comprises a plurality of Baseband Units (BBUs) including a first BBU and a second BBU, the method comprising:
   receiving, by a second BBU and from a network node in the telecommunication network, a Stack Selector parameter, wherein the Stack Selector parameter indicates which of two protocol stacks are to be used by the UE for communication with the second BBU, wherein:
      the UE comprises the two protocol stacks that can be used for same type of connections with the plurality of BBUs, and
      the UE is connected to the first BBU using a first of the two protocol stacks for communication with the first BBU; and
   transmitting, by the second BBU and to the UE, a downlink grant message, wherein the downlink grant message comprises the Stack Selector parameter.

2. The method of claim 1, wherein, the receiving the Stack Selector parameter comprises any of:
   receiving, by the second BBU and from the first BBU, the Stack Selector parameter;
   receiving, by the second BBU and from a central network node configured to coordinate Stack Selector parameters among the plurality of BBU's, the Stack Selector parameter.

3. The method of claim 1, wherein the Stack Selector parameter indicates a different protocol stack to be used for communication by the second BBU with the UE compared to the protocol stack used for communication by the first BBU with the UE.

4. The method of claim 1:
   wherein the Stack Selector parameter indicates a same protocol stack to be used for communication by the second BBU with the UE as to the protocol stack used for communication by the first BBU with the UE;
   the method further comprising the second BBU:
      receiving, from the network node in the telecommunication network, a Stack Reset parameter, wherein the Stack Reset parameter indicates to the UE that the protocol stack corresponding to the Stack Selector parameter is to be reset;
      transmitting the Stack Reset parameter to the UE.

5. The method of claim 4, wherein the transmitting the Stack Reset parameter comprises any of:
   transmitting, by the second BBU, the Stack Reset parameter in the downlink grant message;
   transmitting, by the second BBU, the Stack Reset parameter in a separate control message.

6. The method of claim 1, wherein the second BBU is the first BBU.

7. A method of connecting a dual connectivity capable User Equipment (UE) with a radio access network (RAN) in a telecommunication network, wherein the RAN comprises a plurality of Baseband Units (BBUs), including a first BBU and a second BBU, the method comprising:
   receiving, by the dual connectivity capable UE and from the second BBU in the RAN, a Stack Selector parameter, wherein the Stack Selector parameter indicates which of two protocol stacks are to be used by the dual connectivity capable UE for communication with the second BBU, wherein:
      wherein the dual connectivity capable UE comprises the two protocol stacks that can be used for communications with the plurality of BBUs, and
      the dual connectivity capable UE is connected to the first BBU using a first of the two protocol stacks for communication with the first BBU;
   delivering, by the dual connectivity capable UE, a received downlink grant message to a Radio Link Control (RLC) entity of the protocol stacks that corresponds to the Stack received Selector parameter.

8. The method of claim 7, wherein the method further comprises:
   receiving, by the UE, a further downlink grant message from the same or another BBU in the RAN, wherein the further downlink grant message comprises a further Stack Selector parameter, wherein the Stack Selector parameter indicates which other of the two protocol stacks are to be used by the UE for the communication with the second BBU;
   delivering, by the UE, the received downlink scheduling control message to a further RLC entity of the other one of the two protocol stacks that corresponds to the Stack Selector parameter.

9. The method of claim 8, wherein the Stack Selector parameter indicates a different protocol stack to be used for communication by the second BBU with the UE compared to the protocol stack used for communication by the first BBU with the UE.

10. The method of claim 8:
    wherein the Stack Selector parameter indicates a same protocol stack to be used for communication by the UE with the second BBU as to the protocol stack used for communication by the UE with the first BBU;
    the method further comprising:
    receiving, by the UE and from the second BBU, a Stack Reset parameter, wherein the Stack Reset parameter indicates to the UE that the protocol stack corresponding to the Stack Selector parameter is to be reset;
    resetting, by the UE, at least a Radio Link Control layer of the protocol stack corresponding to the Stack Selector parameter.

11. The method of claim 10, wherein the receiving the Stack Reset parameter comprises:
    receiving, by the UE, the Stack Reset parameter in the downlink grant message;
    receiving, by the UE, the Stack Reset parameter in a separate control message.

12. The method of claim 8, wherein the second BBU is the first BBU.

13. A second Baseband Unit (BBU) for supporting connecting a User Equipment (UE) with a radio access network (RAN) in a telecommunication network, wherein the RAN comprises a plurality of BBUs including a first BBU, the second BBU comprising:
    receive equipment operable to receive a Stack Selector parameter from a network node in the telecommunication network, wherein the Stack Selector parameter indicates which of two protocol stacks are to be used by the UE for communication with the second BBU, wherein:

the UE comprises the two protocol stacks that can be used for same type of connections with the plurality of BBUs, and the UE is connected to the first BBU using a first of the two protocol stacks for communication with the first BBU; and transmit equipment operable to transmit to the UE a downlink grant message, wherein the downlink grant message comprises the Stack Selector parameter.

14. The second BBU of claim 13:

wherein the Stack Selector parameter indicates a same protocol stack to be used for communication by the second BBU with the UE as to the protocol stack used for communication by the first BBU with the UE;

wherein the receive equipment is further operable to receive a Stack Reset parameter from the network node in the telecommunication network, wherein the Stack Reset parameter indicates to the UE that the protocol stack corresponding to the Stack Selector parameter is to be reset; and wherein the transmit equipment is further operable to transmit the Stack Reset parameter to the UE.

15. A dual connectivity capable User Equipment (UE) for supporting connecting the dual connectivity capable UE with a radio access network (RAN) in a telecommunication network, wherein the dual connectivity capable UE comprises:

two protocol stacks that can be used for communications with Baseband Units (BBUs), wherein the dual connectivity capable UE is connected to a first BBU in the RAN using a first of the two protocol stacks for communication with the first BBU receive equipment operable to receive, from a second BBU in the RAN, a Stack Selector parameter, wherein the Stack Selector parameter indicates which of the two protocol stacks are to be used by the dual connectivity capable UE for communication with the second BBU;

deliver equipment operable to deliver a received downlink grant message to a Radio Link Control (RLC) entity of the protocol stacks that corresponds to the Stack received Selector parameter.

16. A non-transitory computer readable recording medium storing a computer program product for connecting a User Equipment (UE) with a radio access network (RAN) in a telecommunication network, wherein the RAN comprises a plurality of Baseband Units (BBUs), wherein the UE comprises two protocol stacks that can be used for same type of connections with BBU's, and wherein the UE is connected to a first BBU using a first of the two protocol stacks for communication with the first BBU, the computer program product comprising software instructions which, when run on processing circuitry of a second BBU, causes the second BBU to:

receive, from a network node in the telecommunication network, a Stack Selector parameter, wherein the Stack Selector parameter indicates which of the two protocol stacks are to be used by the UE for communication with the second BBU;

transmit, to the UE, a downlink grant message, wherein the downlink grant message comprises the Stack Selector parameter.

17. A non-transitory computer readable recording medium storing a computer program product for connecting a dual connectivity capable User Equipment (UE) with a radio access network (RAN) in a telecommunication network, wherein the RAN comprises a plurality of Baseband Units (BBUs), including a first BBU and a second BBU, the computer program product comprising software instructions which, when run on processing circuitry of the UE entity, causes the dual connectivity capable UE to:

receive, from the second BBU in the RAN, a Stack Selector parameter, wherein the Stack Selector parameter indicates which of two protocol stacks are to be used by the dual connectivity capable UE for communication with the second BBU, wherein:

the dual connectivity capable UE comprises the two protocol stacks that can be used for communications with the plurality of BBUs, and the dual connectivity capable UE is connected to the first BBU using a first of the two protocol stacks for communication with the first BBU; and deliver a received downlink grant message to a Radio Link Control (RLC) entity of the protocol stacks that corresponds to the Stack received Selector parameter.

* * * * *

UNITED STATES PATENT AND TRADEMARK OFFICE
CERTIFICATE OF CORRECTION

Page 1 of 1

PATENT NO. : 10,880,937 B2
APPLICATION NO. : 15/511254
DATED : December 29, 2020
INVENTOR(S) : Wiberg et al.

It is certified that error appears in the above-identified patent and that said Letters Patent is hereby corrected as shown below:

On the Title Page

Item (57), under "ABSTRACT", in Column 2, Lines 3-4, delete "Baseband Units, BBU's," and insert -- Baseband Units, BBUs, --, therefor.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*